US012314175B2

(12) United States Patent
Fetterman et al.

(10) Patent No.: US 12,314,175 B2
(45) Date of Patent: May 27, 2025

(54) CACHE MEMORY WITH PER-SECTOR CACHE RESIDENCY CONTROLS

(71) Applicant: NVIDIA CORPORATION, Santa Clara, CA (US)

(72) Inventors: Michael Fetterman, Lancaster, MA (US); Shirish Gadre, Fremont, CA (US); Steven James Heinrich, Madison, AL (US); Martin Stich, Memmingen (DE); Liang Yin, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 15 days.

(21) Appl. No.: 17/702,458

(22) Filed: Mar. 23, 2022

(65) Prior Publication Data

US 2023/0305957 A1 Sep. 28, 2023

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .......... G06F 12/0802; G06F 2212/60
See application file for complete search history.

(56) References Cited

U.S. PATENT DOCUMENTS

| | | | |
|---|---|---|---|
| 2008/0189487 A1* | 8/2008 | Craske ............... | G06F 12/0859 711/E12.051 |
| 2013/0111136 A1* | 5/2013 | Bell, Jr. .............. | G06F 12/0811 711/E12.017 |
| 2016/0041852 A1* | 2/2016 | Suarez Gracia ...... | G06F 9/4856 713/323 |
| 2016/0055095 A1* | 2/2016 | Faraboschi ......... | G06F 12/0893 711/118 |
| 2019/0138359 A1* | 5/2019 | Rangarajan .......... | G06F 9/5027 |

\* cited by examiner

*Primary Examiner* — Gurtej Bansal
(74) *Attorney, Agent, or Firm* — Squire Patton Boggs LLP; Sarah Mirza (57) ABSTRACT

Various embodiments include techniques for managing cache memory in a computing system. The computing system includes a sectored cache memory that provides a mechanism for software applications to directly invalidate data items stored in the cache memory on a sector-by-sector basis, where a sector is smaller than a cache line. When all sectors in a cache line have been invalidated, the cache line is implicitly invalidated, freeing the cache line to be reallocated for other purposes. In cases where the data items to be invalidated can be aligned to sector boundaries, the disclosed techniques effectively use status indicators in the cache tag memory to track which sectors, and corresponding data items, have been invalidated by the software application. Thus, the disclosed techniques thereby enable a low-overhead solution for invalidating individual data items that are smaller than a cache line without additional tracking data structures or consuming additional memory transfer bandwidth.

20 Claims, 6 Drawing Sheets

FIGURE 6

CACHE MEMORY WITH PER-SECTOR CACHE RESIDENCY CONTROLS

BACKGROUND

Field of the Various Embodiments

Various embodiments relate generally to compute memory architectures and, more specifically, to a cache memory with per-sector cache residency controls.

Description of the Related Art

A computing system generally includes, among other things, one or more processing units, such as central processing units (CPUs) and/or graphics processing units (CPUs), and one or more memory systems. Processing units execute user mode software applications, which submit and launch compute tasks, executing on one or more compute engines included in the processing units. Processing units include a multitiered memory system to improve performance when loading data from and storing data to memory.

Multitiered memory systems include a relatively large, and relatively lower performance, system memory for storing large amounts of program instructions included in the user mode software applications along with data accessed over time by the user mode software applications during execution. Further, multitiered memory systems include a relatively small, and relatively higher performance, cache memory for storing those program instructions and data that are currently or imminently accessible to the user mode software applications. A cache controller loads the cache memory with instructions and data from system memory at the time of use or just prior to the time of use. As a result, the processing unit is able to load instructions and data from higher performance cache memory for instructions and data more often than from lower performance system memory. The processing unit thereby realizes improved memory performance relative to a nonhierarchical memory system with only system memory.

The processing unit can also store data to the cache memory. For example, a cache memory can be organized as a set of cache lines, where each cache line includes dozens or hundreds of bytes of data. When the cache controller initially loads a cache line with data from system memory, the cache line is considered clean, because the data in the cache line is identical with the data in the corresponding portion of system memory. If the processing unit stores one or more new or updated bytes of data into the cache line, the data in the cache line is no longer identical with the data in the corresponding portion of system memory. Such a cache line is marked as dirty. The cache controller eventually writes the dirty cache line to system memory and marks the cache line as clean.

In general, the available memory transfer bandwidth between the system memory and the cache memory is limited. Therefore, cache memory performance can be improved by reducing the data transfer traffic between the system memory and the cache memory. One technique to reduce this data transfer traffic is to prevent write back of certain dirty cache lines from the cache memory to the system memory. If a software application knows that a certain range of memory addresses are no longer needed by the software application, then the software application can invalidate any cache lines that contain data in the range of memory addresses. The cache controller is inhibited from writing invalidated cache lines back to memory, even for invalidated cache lines that include dirty data, leading to reduced transfer traffic between the system memory and the cache memory. Further this approach for invalidation of cache lines can lead to incoherent semantics (such as dirty data that may be permanently lost). Even so, this approach for invalidation of cache lines can be explicitly allowed by a software application that no longer needs the data in the affective cache lines.

One problem with this technique for reducing transfer traffic is that the range of memory addresses being invalidated by the software application may not align with the addresses of the corresponding cache lines. For example, a cache line can have a first portion that falls within the range of memory addresses being invalidated and a second portion that falls outside of the range. If the second portion of the cache line contains any dirty data, then the cache line needs to be written back to memory prior to invalidation. In a sectored cache, where each cache line is divided into a group of sectors, only the dirty sectors need to be written back to memory prior to invalidation. In either case, requiring write back prior to invalidation can defeat the purpose of invalidation in the first instance. Alternatively, the software application can generate a tracking data structure that tracks each cache line, identifying which portions of each cache line are valid and which portions are invalid. However, this tracking data structure itself is stored in cache memory, thereby consuming memory transfer bandwidth between the system memory and the cache memory, which is at odds with the goal of reducing memory transfer bandwidth.

As the foregoing illustrates, what is needed in the art are more effective techniques for managing cache memory in a computing system.

SUMMARY

Various embodiments of the present disclosure set forth a computer-implemented method for managing cache memory in a computing system. The method includes detecting an instruction to invalidate a first sector in a first cache line of a cache memory. The method further includes determining a location of the first sector in the cache memory. The method further includes identifying a first status indicator associated with the first sector based on the location. The method further includes modifying the first status indicator while maintaining status indicators for a second sector in the first cache line, wherein the modified first status indicator invalidates the first sector.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, a cache memory can invalidate cache memory at finer resolutions than an entire cache line. As a result, write back of dirty cache lines is reduced relative to prior approaches that could only invalidate entire cache lines, leading to improved cache memory performance and faster execution of software applications. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
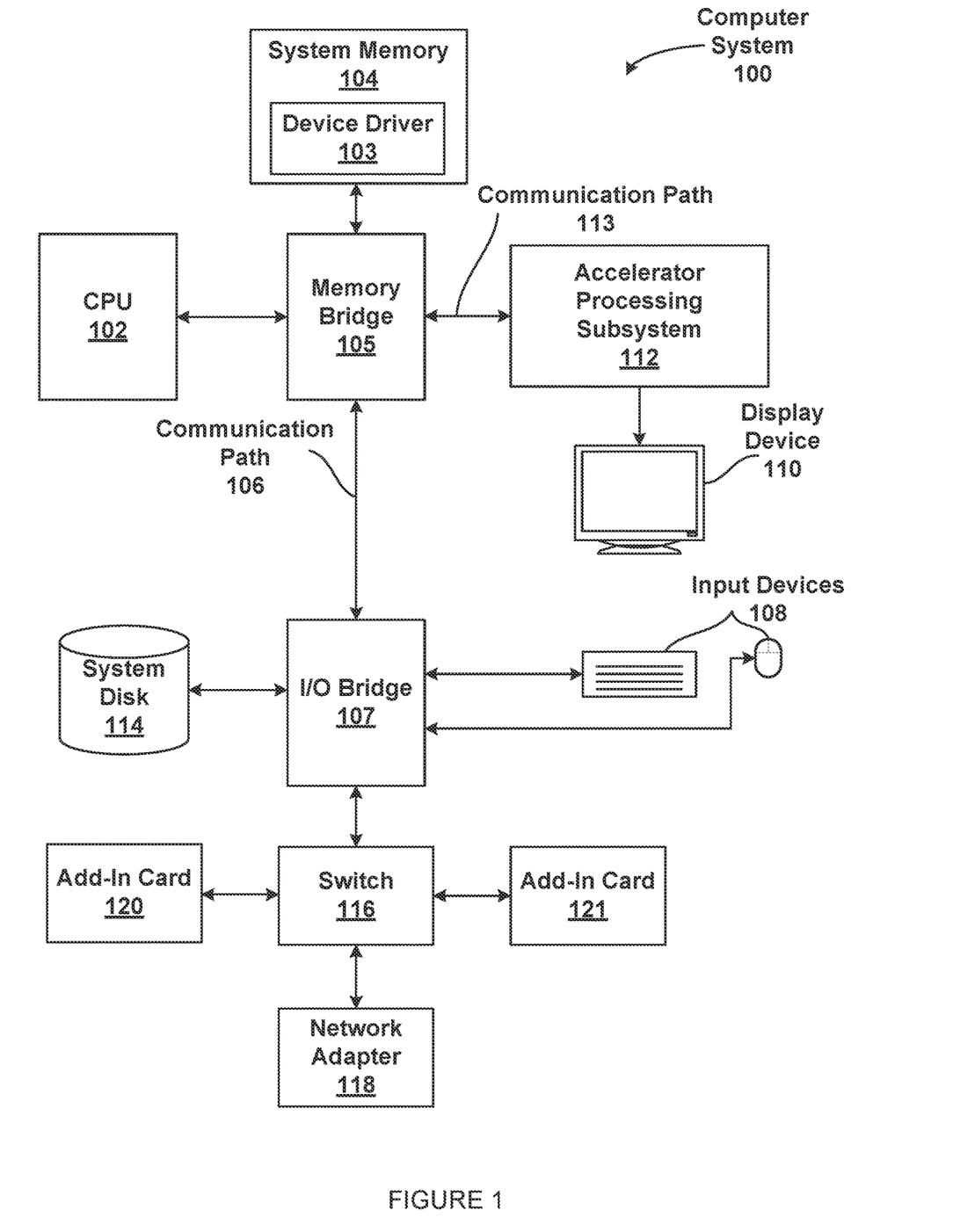
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
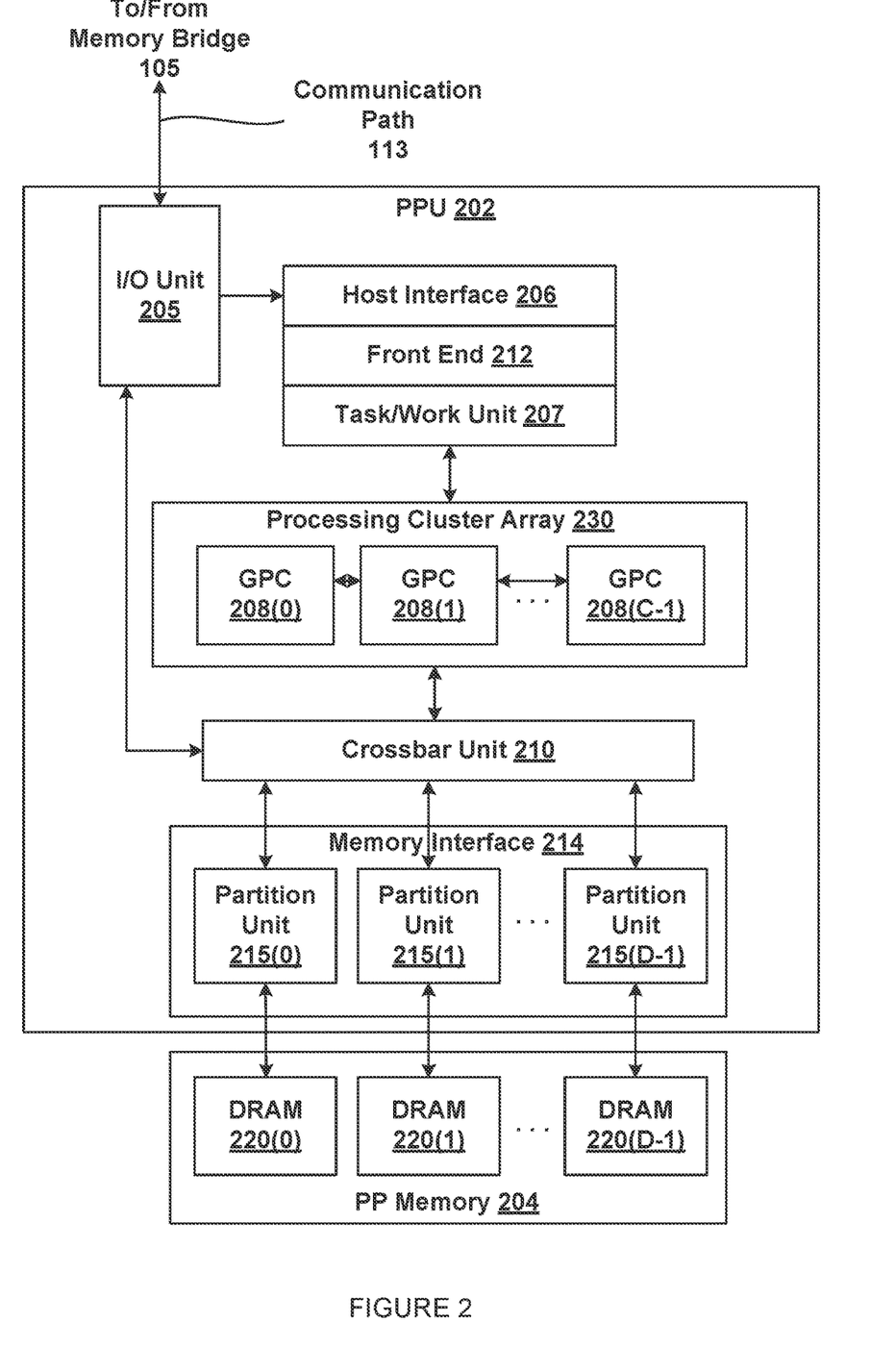
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing subsystem 112 of FIG. 1. Alternative accelerators include, without limitation, CPUs, GPUs, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
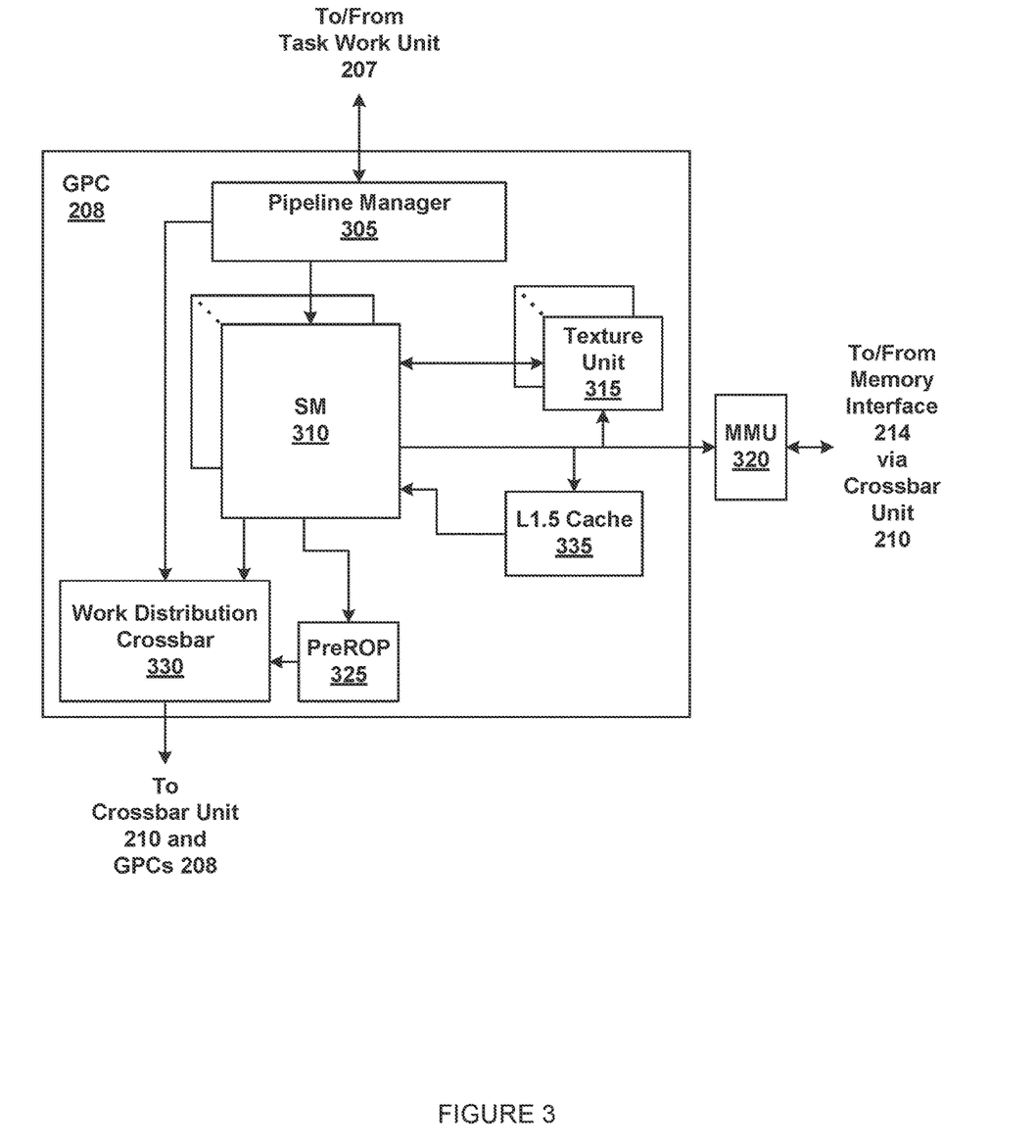
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Managing Cache Memory with Per-Sector Residency Controls

Various embodiments include techniques for managing a sectored cache memory in a computing system, where the cache memory has per-sector cache residency controls. The sectored cache memory provides a mechanism for software applications to invalidate data items stored in the cache memory at finer granularity than entire cache lines. Prior to the disclosed techniques, if a software application stores data items in cache memory that are significantly smaller than the size of a cache line, then the software application may not be able to take advantage of cache line invalidation. In order to invalidate individual items in a random order, the software application could generate a tracking data structure to track the validity of individual data items on each cache line. When the software application determines that all data items on a given cache line have been invalidated, the software application can invalidate the entire cache line. However, this tracking data structure itself can consume additional cache memory capacity and memory transfer bandwidth, which negates some of the benefits of explicit cache memory capacity management via invalidation.

By contrast, the disclosed techniques provide a mechanism for the software application to directly invalidate data items stored in the cache memory on a sector-by-sector basis, where a sector is smaller than a cache line. When all sectors in a cache line have been invalidated, the cache line itself is implicitly invalidated, freeing the cache line to be reallocated for other purposes. In cases where the data items to be invalidated can be aligned to sector boundaries, the disclosed techniques effectively employ the per-sector valid and/or dirty bits in the cache tag memory as the tracking structure that the software application would otherwise have to manage separately. Thus, the disclosed techniques thereby enable a low-overhead solution for invalidating individual data items that are smaller than a cache line without managing additional tracking data structures and without consuming additional memory transfer bandwidth.

The disclosed techniques further include a mechanism for invalidating a sequence of sectors with a single transaction. In addition, the disclosed techniques include a mechanism for loading a sector from cache memory as part of an atomic operation, invalidating the sector as part of the same atomic operation, and returning the data to the executing program. This mechanism eliminates the need for separate load and invalidate operations. Depending on the use case, this mechanism can also eliminate the need for executing an ordering operation, such as a memory barrier, between invalidating sectors and subsequently reallocating the sectors for other purposes.

Figure 4:
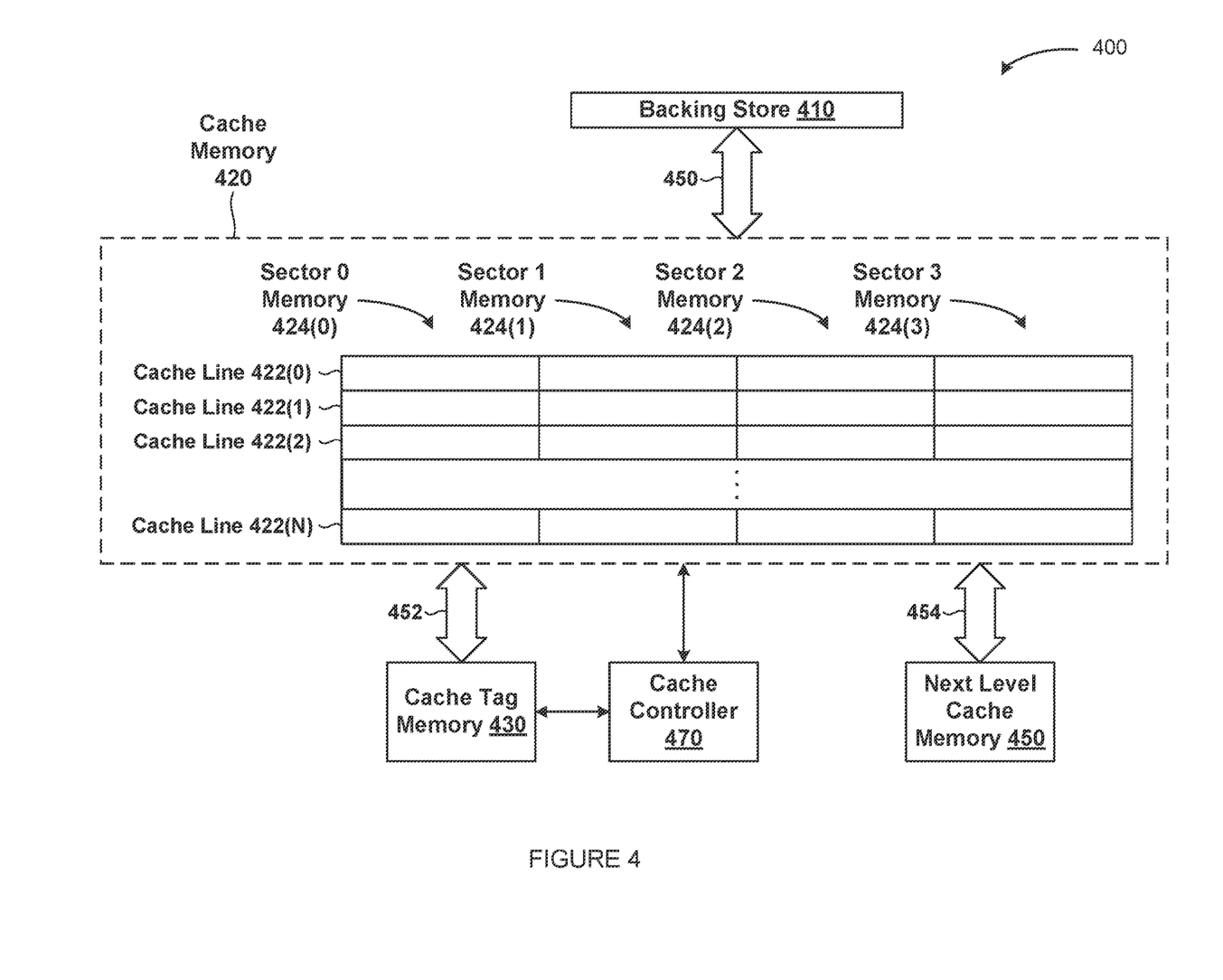
FIG. 4 is a block diagram of a cache memory system included in the CPU of FIG. 1 and/or the PPU of FIG. 2, according to various embodiments.

FIG. 4 is a block diagram of a cache memory system 400 included in the CPU 102 of FIG. 1 and/or the PPU 202 of FIG. 2, according to various embodiments. As shown, the cache memory system 400 includes, without limitation, a backing store 410, a cache memory 420, a cache tag memory 430, a next level cache memory 440, and a cache controller 470.

The cache memory 420 can include any one or more technically feasible memories described herein, including, without limitation, an L1 cache, an L1.5 cache, or an L2 cache. The cache memory 420 maintains cache lines 422 that are loaded from a backing store 410.

The backing store 410 can include any one or more technically feasible memories described herein, including, without limitation, system memory 104 or PP memory 204. Additionally or alternatively, the backing store 410 can include a cache memory further from the CPU 102 and/or the PPU 202 relative to the cache memory 420. In some examples, the cache memory 420 can be an L2 cache and the backing store 410 can be system memory 104 or PP memory 204. The cache memory 420 can be an L1.5 cache and the backing store 410 can be an L2 cache. The cache memory 420 can be an L1 cache and the backing store 410 can be an L1.5 cache, and so on.

Unless the cache memory 420 is the cache memory closest to the CPU 102 and/or the PPU 202, the next level cache memory 440 includes a cache memory closer to the CPU 102 and/or the PPU 202 relative to the cache memory 420. In some examples, the cache memory 420 can be an L2 cache and the next level cache memory 440 can be an L1.5 cache. The cache memory 420 can be an L1.5 cache and the next level cache memory 440 can be an L1 cache, and so on.

In operation, the cache controller 470 manages the cache memory 420. The cache controller 470 loads cache lines 422, or portions thereof, of the cache memory 420 with data loaded from the backing store 410. In general, the cache controller 470 loads cache lines 422, or portions thereof, of the cache memory 420 at the time of use or just prior to the time of use by the processing unit. In total, the cache memory 420 includes N+1 cache lines 422, numbered cache line 422(0), cache line 422(1), cache line 422(2), . . . , cache line 422(N). Each cache line 422 includes four sectors, stored respectively in sector 0 memory 424(0), sector 1 memory 424(1), sector 2 memory 424(2), and sector 3 memory 424(3). More generally, each cache line 422 can include any technically feasible number of sectors. In some examples, the number of sectors in each cache line 422 is a power of two, such as two sectors per cache line 422, four sectors per cache line 422, eight sectors per cache line 422, and/or the like. When loading a cache line 422, the cache controller 470 can load a single sector memory 424 of a cache line or can load 2, 3, or all 4 sector memories of the cache line 422.

In some examples, each cache line 422 includes 128-bytes and each cache line 422 includes four sectors, resulting in 128-bytes per cache line 422 divided by four sectors per cache line 422 equaling 32-bytes per sector. The communications channel 450 between the backing store 410 and the cache memory 420 can have the same data width as a sector, namely, 32 bytes.

To load one or more sector memories 424 in a cache line 422, the cache controller 470 begins with a virtual address within the virtual address space of a software application. The cache controller 470 divides the virtual address into portions, including a cache line tag, a sector number, and a sector offset. The sector number and the sector offset, taken together, form a cache line offset. For a cache memory 420 with cache lines 422 of 128 (or $2^7$) bytes, the cache line offset is the seven least significant bits (LSBs) of the virtual address. Correspondingly, in some examples, the cache line tag is the portion of the virtual address other than the seven LSBs. For a cache memory 420 with cache lines 422 consisting of four (or $2^2$) sectors, the two most significant bits (MSBs) of the cache line offset is the sector number. Further, because each sector includes 32 (or $2^5$) bytes, the sector offset is the five LSBs of the cache line offset.

If the entire cache line 422 is being loaded, then the cache controller 470 generates four load transactions over the communications channel 450 to retrieve four sectors of 32-bytes each and stores the four sectors in the four sector memories 424 of the cache line 422. If a single sector of the cache line 422 is being loaded, then the cache controller 470 combines the physical address that addresses the beginning of the 128 bytes in the backing store 410 with the 2-bit sector number to identify the beginning of address of the sector in the backing store 410. The cache controller 470 generates a single load transaction over the communications channel 450 to retrieve the 32-byte sector and stores the sector in the corresponding sector memory 424 of the cache line 422. In a similar manner, the cache controller 470 can load two or three sectors of a cache line by generating two 32-byte load transactions or three 32-byte load transactions, respectively. The cache controller 470 stores the cache line tag in the cache tag memory 430, along with status indicators to indicate that the loaded sectors are valid and clean (not dirty). When the processing unit subsequently accesses data included in one or more valid sectors, the memory management accesses the cache line tag in the cache tag memory 430 to access the corresponding sector memory 424 of the cache line 422 via the communications channel 452. Similarly, the next level cache memory 440 can load entire cache lines or sectors thereof by generating load transactions over the communications channel 454 to load data from the cache memory 420 into the next level cache memory 440.

Figure 5:
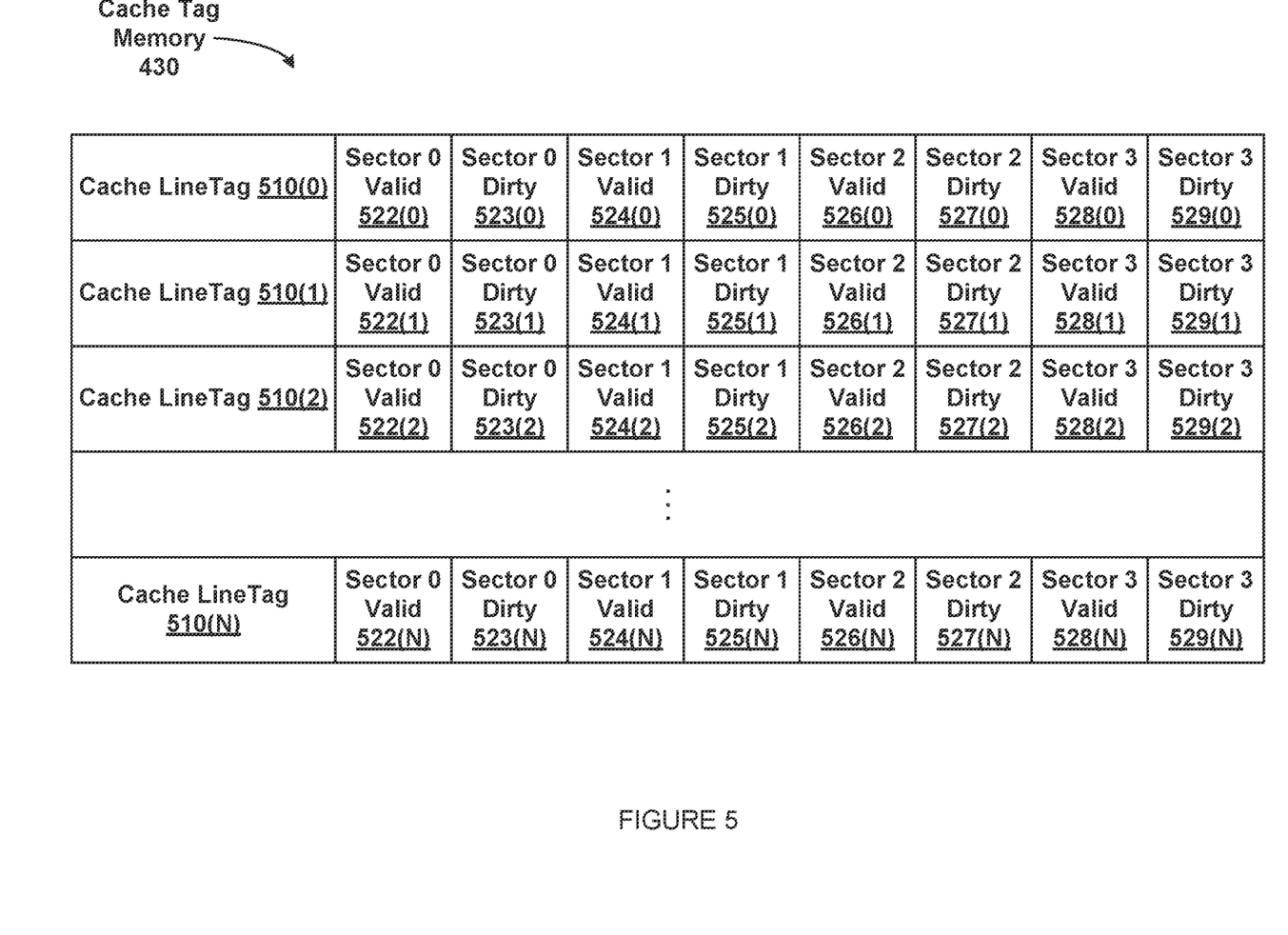
FIG. 5 is a block diagram of the cache tag memory of FIG. 4, according to various embodiments.

FIG. 5 is a block diagram of the cache tag memory 430 of FIG. 4, according to various embodiments. As shown, the cache tag memory 430 includes, without limitation, N+1 cache line tags 510, numbered cache line tag 510(0), cache line tag 510(1), cache line tag 510(2), . . . , cache line tag 510(N). In some examples, the cache line tags 510 have a one-to-one correspondence to the cache lines 422 in the cache memory 420. In such examples, cache line tag 510(0) corresponds to cache line 422(0), cache line tag 510(1) corresponds to cache line 422(1), cache line tag 510(2) corresponds to cache line 422(2), and so on. Additionally or alternatively, the cache line tags 510 do not have a one-to-one correspondence to the cache lines 422 in the cache memory 420. In such examples, each cache line tag 510 can correspond to any cache line 422 in the cache memory 420. Each cache line tag 510 is associated with a cache line address (not shown in FIG. 5) that identifies the cache line 422 associated with the respective cache line tag 510.

Each cache line tag 510 is associated with status indicators for each sector represented by the cache line tag 510. In a particular example, cache line tag 510(0) is associated with a sector 0 valid indicator 522(0) and a sector 0 dirty indicator 523(0). Cache line tag 510(0) is further associated with a sector 1 valid indicator 524(0) and a sector 1 dirty indicator 525(0). Cache line tag 510(0) is further associated with a sector 2 valid indicator 526(0) and a sector 2 dirty indicator 527(0). Cache line tag 510(0) is further associated with a sector 3 valid indicator 528(0) and a sector 3 dirty indicator 529(0). Other cache line tags 510 in the cache tag memory 430 are associated with valid indicators and dirty indicators for sectors 0, 1, 2, and 3, respectively.

Taken together, the valid indicator and the dirty indicator indicate one of three potential status conditions of the corresponding sector. First, if the valid indicator indicates that the sector is not valid, then the data stored in the corresponding sector memory 424 cannot be relied upon, regardless of the state of the dirty indicator. Therefore, when a software application accesses such an invalid sector, the data corresponding to the invalid sector is retrieved from the backing store 410. Second, if the valid indicator indicates that the sector is valid and the dirty indicator indicates that the sector is clean (that is, not dirty), then the corresponding sector memory 424 of the cache line 422 contains valid data. Further, the data is clean, indicating that the processing unit has not written new data to the sector memory that has not yet been written to the backing store 410. Third, if the valid indicator indicates that the sector is valid and the dirty indicator indicates that the sector is dirty, then the corresponding sector memory 424 of the cache line 422 contains valid data. However, the data in the sector memory includes new data that has not yet been written to the backing store 410. Therefore, the data in the sector memory 424 does not match the corresponding data in the backing store 410. At some future time, the cache controller 470 writes valid, dirty sectors from the cache memory 420 to the backing store 410 so that the data in the backing store 410 matches the data in the sector memory 424. Until the writeback occurs, processing units access the sector memory 424 of the cache line 422 when accessing the corresponding data in order to ensure that the processing units access the updated version of the data.

When the cache controller 470 initially loads a sector memory 424 of a cache line 422 from the backing store 410, the cache controller 470 modifies the corresponding status indicators in the cache tag memory 430 to indicate that the sector is valid and clean. If a processing unit stores new and/or updated data to one or more bytes of a sector, then the cache controller 470 modifies the dirty indicator in the cache tag memory 430 to indicate that the sector is valid and dirty. The cache controller 470 schedules the sector for a writeback operation to the backing store 410 at a future time. Typically, invalidation of a cache line 422 that contains dirty data implies that the dirty data is written back, or flushed, to the backing store 410 before the invalidation occurs. Invalidation without first writing dirty data to the backing store 410 can lead to data incoherency, where the dirty data in the cache line 422 is permanently lost. However, this incoherency may be acceptable in cases where the software application explicitly indicates that the dirty data is no longer needed and can be discarded.

More specifically, flushing dirty data and/or invalidating dirty data can be accomplished via various techniques. In a first technique, dirty data in cache lines 422, and/or sectors thereof, is flushed to the backing store 410 prior to invalidation. In a second technique, cache lines 422, and/or sectors thereof, that include dirty data are invalidated without flushing the cache lines 422 and/or sectors to the backing store 410. In a third technique, dirty data in cache lines 422, and/or sectors thereof, is flushed to the backing store 410 prior to invalidation, where the flushing and invalidation are performed via an atomic operation. In a fourth technique, data is loaded into cache lines 422, and/or sectors thereof, from the backing store and the cache lines 422 and/or sectors are invalidated, where the loading and invalidation are performed via an atomic operation, as described herein. In some examples, if the point of coherence of the data at a level into the memory system is less than or equal to the current level of the cache memory 420, or if the lifetime of the data has expired, and if that condition applies to the entirety of a cache line 422 and/or sector, then that cache line 422 and/or sector can be invalidated without first flushing dirty data contained in the cache line 422 and/or sector.

In some cases, a software application can determine that the data stored in a memory address range is no longer needed by the software application. As a result, sector memories 424 in cache lines 422 that store data within the memory range can be freed up and be reallocated for other purposes. To free up such sectors, the software application issues an instruction to indicate that a specified memory address range is invalid. By indicating that the specified memory address range is invalid, the software application agrees that the data stored in the memory address range is no longer reliable to hold data previously accessed by the software application. Upon detecting this instruction, the cache controller 470 determines which sector memories 424 in the cache memory 420 store data within the specified address range. For each such sector memory 424, the cache controller 470 modifies the valid indicator and/or the dirty indicator to inhibit writeback of the data in the sector memory 424 to the backing store 410.

The cache controller 470 can inhibit writeback of the data in the sector memory 424 to the backing store 410 via at least two techniques. In a first technique, the cache controller 470 modifies the valid indicator to identify the sector as invalid. Therefore, the software application cannot rely on any data stored in the corresponding sector memory 424. Because the data in the sector memory 424 is invalid, the sector memory 424 is not written to the backing store 410. With this first technique, both the software application and the cache tag memory 430 identify the data in the sector memory 424 as invalid. In a second technique, the cache controller 470 modifies the dirty indicator to indicate that the data in the sector is clean and leaves the valid indicator as is. Because the data in the sector is identified as clean, the sector memory 424 is not written to the backing store 410. With this second technique, the software application identifies the data in the sector memory 424 as invalid, but the cache tag memory 430 identifies the data in the sector memory 424 as valid and clean. Even so, the software application does not rely on the data in the sector memory 424 because the software application considers the data to be invalid. Further, the cache controller 470 inhibits writeback of the data in the sector memory 424 to the backing store 410 because the cache controller 470 considers the data to be clean. Therefore, the result with this second technique is equivalent to the first technique. With each technique, the software application does not rely on the data stored in the affected sector memories 424, and the cache controller 470 inhibits writeback of the data in the sector memories 424 to the backing store 410.

In order to take advantage of per-sector invalidation, a software application can pack data items into an integer number of sectors. The software application can place a single data item into a single sector. Additionally or alternatively, the software application can place multiple related data items into a single sector. Additionally or alternatively, the software application can place a single data item or multiple related data items into an integer number of sectors, such as two sectors, three sectors, four sectors, and so on. To invalidate a data item or multiple related data items, the software application issues an instruction to invalidate an address range that includes the sectors that contain the data item(s) to invalidate. In response, the cache controller 470 modifies the status indicators for the corresponding sector memories 424 to prevent writeback of the sector memories 424 to the backing store 410 to the backing store. In this manner, the software application effectively maintains a mapping between data items and sectors without having to maintain a separate tracking data structure, even if sectors are invalidated in a random order and/or an apparently random order. Although each data item can be of any arbitrary size, efficiencies can be achieved when the data item(s) being invalidated are sized close to an integer number of sectors.

In general, valid sectors that contain dirty data can be stored to the backing store 410 at any time, and in any combination and/or order, and marked as clean. If the dirty data in a sector is no longer needed, then the sector can be marked either as invalid or as valid and clean, thereby inhibiting write back of the dirty data to the backing store 410. The individual sectors of a cache line 422 can be thusly marked at different points in time, and in any combination and/or order. The individual sectors of a cache line 422 can be thusly marked by different asynchronous agents, such as by different threads executing on different SMs 310 within the PPU 202. The existing sector valid bits in the cache tag memory 430 can track which individual sectors of each cache line 422 have been invalidated, and/or marked as valid and clean, and which individual sectors of each cache line 422 are marked as valid and dirty.

Per-sector invalidation is further compatible with cache line eviction and reallocation strategies. As the software application and the cache controller 470 invalidate individual sectors, a particular cache line 422 can include invalid sectors, valid clean sectors, and valid dirty sectors, in any combination. As long as a cache line 422 has at least one valid dirty sector, then the cache line 422 is written back to the backing store 410 prior to evicting the cache line 422 and prior to reallocating the cache line 422 for a different purpose and/or with a different cache line tag 510. A cache line 422 can include only invalid sectors and valid clean sectors because sectors of the cache line were not loaded in the first instance, sectors of the cache line were loaded but not updated by the processing unit, and/or sectors of the cache line were invalidated as described herein, in any combination. Once a cache line 422 includes only invalid sectors and/or valid clean sectors, the cache controller 470 can evict the cache line 422 without writeback to the backing store 410. The cache controller 470 can implement a cache line eviction and replacement policy that takes advantage of the per-sector invalidation when determining which cache lines 422 to evict. In that regard, the cache controller 470 can preferably select a cache line 422 for eviction that includes only invalid sectors and/or valid clean sectors over a cache line 422 that includes at least one valid dirty sector. When evicting a cache line 422 that includes at least one valid dirty sector, the cache controller 470 can limit the writeback to only the sectors that are valid and dirty.

In some examples, a memory system can include any number of multiple cache memories that implement the techniques described herein. For example, an L1 cache that implements the disclosed techniques can be coupled to an L2 caches that also implements the disclosed techniques. In such cases, the L1 cache can have a cache line with a particular cache line tag and the L2 cache can also have a cache line with the same particular cache line tag. The cache line in the L1 cache and the cache line in the L2 cache may or may not be in the same relative position in the respective cache memories. Further, the sectors of the cache line in the L1 cache and the corresponding sectors of the cache line in the L2 cache can have the same status indicators or can have different status indicators, in any combination.

Further, cache lines in the L1 cache and cache lines in the L2 cache can have the same number of bytes and/or the same sector size or can have different a number of bytes and/or different sector sizes, in any combination. In that regard, a cache line in one cache memory can map to multiple cache lines in another cache memory, and vice versa. Further, multiple cache lines in one cache memory can store one or more of the same sectors from a given cache line in another cache memory, in any combination.

In some examples, a software application can issue a command to invalidate a sequential set of sectors by specifying a base address of a sector and an integral number of sectors to invalidate. The sequential set of sectors can be in a single cache line 422 or can span two or more cache lines 422. In a first example, the software application can issue a command that specifies a base address of sector 0 of a cache line 422 and specifies that three sectors are invalid. The cache controller 470, in response, invalidates the sector 0 memory 424(0), the sector 1 memory 424(1), and the sector 2 memory 424(2) of the cache line 422 but leaves the sector 3 memory 424(3) of the cache line 422 as is.

In a second example, the software application can issue a command that specifies a base address of sector 3 of a cache line 422 and specifies that three sectors are invalid. The cache controller 470, in response, performs two invalidate operations. The two invalidate operations can be atomic or non-atomic. The first invalidate operation invalidates the sector 3 memory 424(3) of the cache line 422 and leaves the remaining sector memories 424 of the cache line 422 as is. The second invalidate operation identifies the cache line 422 with a cache line tag 510 that is consecutive to the cache line tag 510 of the first invalidate operation. The second invalidate operation invalidates the sector 0 memory 424(0) and the sector 1 memory 424(1) of the consecutive cache line 422 and leaves the remaining sector memories 424 of the consecutive cache line 422 as is.

In some examples, the software application can issue a single atomic instruction that performs a load operation of a single sector and invalidates the sector as one undivided operation. In one example, the load operation loads a 32-byte sector from the cache memory 420 to eight 4-byte registers included in the processing unit. One example use case for such an instruction is where a software application loads a large block of data into memory and then performs a read-once operation to sectors within the large block of data in a random order and/or an apparently random order. Because each sector is invalidated after the load operation and before the atomic operation completes, the invalidated sector is eligible for reallocation, once all other sectors on the same cache line are also eligible for reallocation. Without such an instruction, a software application would generally issue the load operations and the invalidate operations separately. Subsequently, the software application would issue a memory ordering instruction, such as a memory barrier, to ensure that the previous invalidate operations have completed and that the sectors can be reallocated. The load and invalidate atomic instruction accesses the cache memory 420 once, rather than twice as for two separate instructions, thereby reducing the memory transfer bandwidth by half. Further, depending on the use case, the single load and invalidate atomic instruction can eliminate the need for executing a memory barrier or other memory ordering instruction.

It will be appreciated that the system shown herein is illustrative and that variations and modifications are possible. The techniques described herein are in the context of a cache memory 420 with cache lines 422 of 128-bytes and four sector memories 424 of 32-bytes for each cache line 422. However, the disclosed techniques can be employed with cache lines 422 of any size, any number of sectors per cache line 422, and/or with sector memories 424 of any size. The techniques described herein can be applied to any one or more cache levels in a cache memory system in any combination. In that regard, the cache line size, number of sectors, and sector memory size for each cache level can be the same as one another or can be different, in any combination. The techniques described herein are in the context of a computer system 100 that includes one or more memory management units (MMUs) and cache controllers 470. In that regard, the backing store 410, the cache memory 420, and/or the next level cache memory 440 can be accessed via any technically feasible virtual address space and/or physical memory space. One or more MMUs can perform any virtual address to physical address translations and/or physical address to virtual address translations as needed. More generally, the disclosed techniques can be performed regardless of the particular address spaces employed to access the backing store 410, the cache memory 420, and/or the next level cache memory 440, within the scope of the present disclosure.

The techniques described herein are in the context of a communications channel 450 between the backing store 410 and the cache memory 420 that has the same data width as a sector memory 424, namely, 32 bytes. However, the communications channel 450 between the backing store 410 and the cache memory 420 can have a data width of any size, including a data width with fewer bytes than the sector memory 424 or a data width with more bytes than the sector memory 424. Similarly, the communications channel 454 between the cache memory 420 and the next level cache memory 430 can have a data width of any size, including a data width with fewer bytes than the sector memory 424 or a data width with more bytes than the sector memory 424. In addition, the techniques described herein can be applied to any CPU 102, PPU 202, and/or any other processing unit in any combination.

Figure 6:
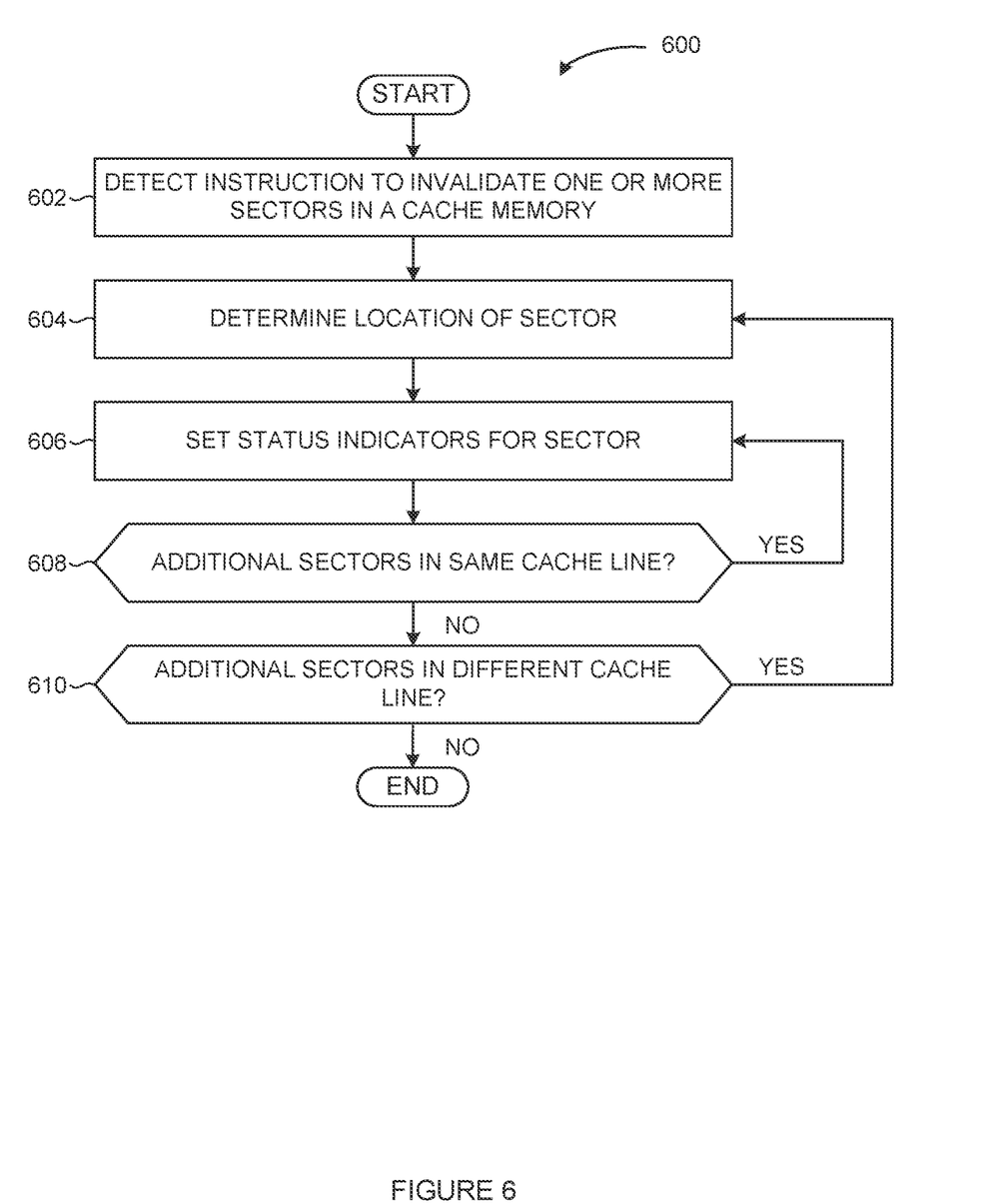
FIG. 6 is a flow diagram of method steps for managing cache memory for a processing unit, such as the CPU of FIG. 1 and/or the PPU of FIG. 2, according to various embodiments.

FIG. 6 is a flow diagram of method steps for managing cache memory for a processing unit, such as the CPU 102 of FIG. 1 and/or the PPU 202 of FIG. 2, according to various embodiments. Additionally or alternatively, the method steps can be performed by one or more alternative accelerators including, without limitation, CPUs, GPUs, IPUs, NPUs, TPUs, NNPs, DPUs, VPUs, ASICs, FPGAs, and/or the like, in any combination. Although the method steps are described in conjunction with the systems of FIGS. 1-5, persons of ordinary skill in the art will understand that any system configured to perform the method steps, in any order, is within the scope of the present disclosure.

As shown, a method 600 begins at step 602, where a cache controller 470 detects a command issued by a software application that invalidates one or more sectors in a cache memory. In some examples, the software application can issue an instruction to indicate that a specified memory address range is invalid. By indicating that the specified memory address range is invalid, the software application agrees that the data stored in the memory address range is no longer reliable to hold data previously accessed by the software application. The memory address range can include sectors that are in a single cache line 422 or sectors that span two or more cache lines 422. In some examples, the software application can issue a command to invalidate a sequential set of sectors by specifying a base address of a sector and an integral number of sectors to invalidate. The sequential set of sectors can be in a single cache line 422 or can span two or more cache lines 422.

At step 604, the cache controller 470 determines the location of a sector. If the cache controller 470 is processing the first sector to be invalidated, the cache controller 470 determines the cache line tag 510 based on the virtual address specified in the instruction issued by the software application. The cache controller 470 divides the virtual address into portions, including a cache line tag 510, a sector number, and a sector offset. The sector number and the sector offset, taken together, form a cache line offset. For a cache memory 420 with cache lines 422 of 128 bytes (or $2^7$ bytes), the cache line offset is the seven least significant bits (LSBs) of the virtual address. Correspondingly, the cache line tag 510 is the portion of the virtual address other than the seven LSBs. For a cache memory 420 with cache lines 422 consisting of four (or $2^2$) sectors, the two most significant bits (MSBs) of the cache line offset is the sector number. Further, because each sector includes 32 bytes (or $2^5$ bytes), the sector offset is the five LSBs of the cache line offset.

The cache controller 470 looks up the cache line tag 510 in the cache tag memory 430 in order to determine the cache line 422 in the cache memory 420 that includes the sector. The cache controller 470 identifies the sector memory 424 within the cache line 422 based on the sector number.

At step 606, the cache controller 470 modifies the status indicators for the sector via any one of two techniques. In a first technique, the cache controller 470 modifies the valid indicator to identify the sector as invalid. Therefore, the software application cannot rely on any data stored in the corresponding sector memory 424. Because the data in the sector memory 424 is invalid, the sector memory 424 is not written to the backing store 410. With this first technique, both the software application and the cache tag memory 430 identify the data in the sector memory 424 as invalid. In a second technique, the cache controller 470 modifies the dirty indicator to indicate that the data in the sector is clean and leaves the valid indicator as is. Because the data in the sector is identified as clean, the sector memory 424 is not written to the backing store 410. With this second technique, the software application identifies the data in the sector memory 424 as invalid, but the cache tag memory 430 identifies the data in the sector memory 424 as valid and clean. Even so, the software application does not rely on the data in the sector memory 424 because the software application considers the data to be invalid. Further, the cache controller 470 inhibits writeback of the data in the sector memory 424 to the backing store 410 because the cache controller 470 considers the data to be clean. Therefore, the result with this second technique is equivalent to the first technique. With each technique, the software application does not rely on the data stored in the affected sector memories 424, and the cache controller 470 inhibits writeback of the data in the sector memories 424 to the backing store 410.

At step 608, the cache controller 470 determines whether additional sectors in the same cache line 422 are to be invalidated. If the instruction issued by the software application indicates that a specified memory address range is invalid, then the cache controller 470 determines whether the memory address range includes a sector with higher memory addresses than the current sector being invalidated. If the instruction issued by the software application indicates a base memory address and a number of sectors, then the cache controller 470 determines whether the current sector is the final sector in the number of sectors to be invalidated. In either case, the cache controller 470 further determines whether the next sector to be invalidated is in the same cache line 422 as the current sector. In general, the next sector to be invalidated is in the same cache line 422 as the current sector unless the current sector is the last sector of the cache line 422. If additional sectors in the same cache line 422 are to be invalidated, then the method 600 proceeds to step 606, described above.

If, however, no additional sectors in the same cache line 422 are to be invalidated, then the method 600 proceeds to step 610, where the cache controller 470 determines whether additional sectors in a different cache line 422 are to be invalidated. If the instruction issued by the software application indicates that a specified memory address range is invalid, then the cache controller 470 determines whether the memory address range includes a sector with higher memory addresses than the current sector being invalidated. If the instruction issued by the software application indicates a base memory address and a number of sectors, then the cache controller 470 determines whether the current sector is the final sector in the number of sectors to be invalidated. In either case, the cache controller 470 further determines that the next sector to be invalidated is in a different cache line 422 from the current sector. In general, the next sector to be invalidated is in a different cache line 422 as the current sector if the current sector is the last sector of the cache line 422. If additional sectors in a different cache line 422 are to be invalidated, then the method 600 proceeds to step 604, described above.

In so doing, the cache controller 470 determines the location of the next sector to invalidate by identifying the cache line 422 with a cache line tag 510 that is consecutive to the cache line tag 510 that includes the current sector. The location of the next sector to invalidate is the first sector of the cache line 422 with a cache line tag 510 that is consecutive to the cache line tag 510 that includes the current sector.

Returning to step 610, if no additional sectors in a different cache line 422 are to be invalidated, then the method 600 terminates. Alternatively, the method 600 proceeds to step 602 to detect additional instructions that invalidate additional sectors in the cache memory.

In sum, various embodiments include techniques for managing cache memory in a computing system that includes a sectored cache memory. The sectored cache memory provides a mechanism for software applications to invalidate data items stored in the cache memory at finer granularity than entire cache lines. Prior to the disclosed techniques, if a software application stores data items in cache memory that are significantly smaller than the size of a cache line, then the software application may not be able to take advantage of cache line invalidation. In order to invalidate individual items in a random order, the software application could generate a tracking data structure to track the validity of individual data items on each cache line. When the software application determines that all data items on a given cache line have been invalidated, the software application can invalidate the entire cache line. However, this tracking data structure itself consumes additional cache memory capacity and memory transfer bandwidth, which negates some of the benefits of explicit cache memory capacity management via invalidation.

By contrast, the disclosed techniques provide a mechanism for the software application to directly invalidate data items stored in the cache memory on a sector-by-sector basis, where a sector is smaller than a cache line. When all sectors in a cache line have been invalidated, the cache line itself is implicitly invalidated, freeing the cache line to be reallocated for other purposes. In cases where the data items to be invalidated can be aligned to sector boundaries, the disclosed techniques effectively employ the per-sector valid and/or dirty bits in the cache tag memory as the tracking structure that the software application would otherwise have to manage separately. Thus, the disclosed techniques thereby enable a low-overhead solution for invalidating individual data items that are smaller than a cache line without additional tracking data structures or consuming additional memory transfer bandwidth.

The disclosed techniques further include a mechanism for invalidating a sequence of sectors with a single transaction. In addition, the disclosed techniques include a mechanism for loading a sector from cache memory as part of an atomic operation, invalidating the sector as part of the same atomic operation, and returning the data to the executing program. This mechanism eliminates the need for separate load and invalidate operations and also can eliminate the need for executing an ordering operation, such as a memory barrier, between invalidating sectors and subsequently reallocating the sectors for other purposes.

At least one technical advantage of the disclosed techniques relative to the prior art is that, with the disclosed techniques, a cache memory can invalidate cache memory at finer resolutions than an entire cache line. As a result, write back of dirty cache lines is reduced relative to prior approaches that could only invalidate entire cache lines, leading to improved cache memory performance and faster execution of software applications. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing cache memory in a computing system, the method comprising:
    detecting, by a cache controller, an instruction issued by a user mode software application executing on a processing unit and directed to the cache controller, wherein the instruction issued by the user mode software application directs the cache controller to invalidate a specified memory range, wherein the specified memory range is associated with a first sector in a first cache line of a cache memory;
    determining a location of the first sector in the cache memory; and
    upon detecting the instruction issued by the user mode software application executing on the processing unit, modifying a first status indicator associated with the first sector to generate a modified first status indicator while maintaining status indicators for a second sector in the first cache line, wherein the modified first status indicator invalidates the first sector.

2. The computer-implemented method of claim 1, wherein the instruction includes a range of memory addresses to be invalidated, and further comprising:
    determining that the range of memory addresses includes memory addresses associated with a third sector in the first cache line; and
    modifying a second status indicator associated with the third sector that invalidates the third sector.

3. The computer-implemented method of claim 1, wherein the instruction includes a first memory address and a number of sectors to be invalidated, and further comprising:
    determining that a third sector in the first cache line is included in the number of sectors; and
    modifying a second status indicator associated with the third sector that invalidates the third sector.

4. The computer-implemented method of claim 1, wherein the instruction includes a range of memory addresses to be invalidated, and further comprising:
    determining that the range of memory addresses includes memory addresses associated with a third sector in a second cache line of the cache memory; and
    modifying a second status indicator associated with the third sector that invalidates the third sector.

5. The computer-implemented method of claim 1, wherein the instruction includes a first memory address and a number of sectors to be invalidated, and further comprising:
    determining that a third sector in a second cache line of the cache memory is included in the number of sectors; and
    modifying a second status indicator associated with the third sector that invalidates the third sector.

6. The computer-implemented method of claim 1, wherein modifying the first status indicator comprises modifying an indicator associated with the first sector to indicate that the first sector contains invalid data.

7. The computer-implemented method of claim 1, wherein modifying the first status indicator comprises modifying an indicator associated with the first sector to indicate that the first sector does not contain data to be stored in a backing store.

8. The computer-implemented method of claim 1, wherein the first cache line includes 128-bytes, and each sector included in the first cache line includes 32 bytes.

9. The computer-implemented method of claim 1, wherein the cache memory comprises a level one (L1) cache, a level 1.5 (L1.5) cache, or a level two (L2) cache.

10. The computer-implemented method of claim 1, wherein the instruction comprises an atomic operation that loads data from the first sector to one or more registers atomically with modifying the first status indicator associated with the first sector.

11. A system comprising:
a processing unit;
a cache memory; and
a cache controller coupled to the cache memory and configured to:
detect an instruction issued by a user mode software application executing on the processing unit and directed to the cache controller, wherein the instruction issued by the user mode software application directs the cache controller to invalidate a specified memory range, wherein the specified memory range is associated with a first sector in a first cache line of a cache memory;
determine a location of the first sector in the cache memory; and
upon detecting the instruction issued by the user mode software application executing on the processing unit, modify a first status indicator associated with the first sector to generate a modified first status indicator while maintaining status indicators for a second sector in the first cache line, wherein the modified first status indicator invalidates the first sector.

12. The system of claim 11, wherein the instruction includes a range of memory addresses to be invalidated, and wherein the cache controller is further configured to:
determine that the range of memory addresses includes memory addresses associated with a third sector in the first cache line; and
modify a second status indicator associated with the third sector that invalidates the third sector.

13. The system of claim 11, wherein the instruction includes a first memory address and a number of sectors to be invalidated, and wherein the cache controller is further configured to:
determine that a third sector in the first cache line is included in the number of sectors; and
modify a second status indicator associated with the third sector that invalidates the third sector.

14. The system of claim 11, wherein the instruction includes a range of memory addresses to be invalidated, and wherein the cache controller is further configured to:
determine that the range of memory addresses includes memory addresses associated with a third sector in a second cache line of the cache memory; and
modify a second status indicator associated with the third sector that invalidates the third sector.

15. The system of claim 11, wherein the instruction includes a first memory address and a number of sectors to be invalidated, and wherein the cache controller is further configured to:
determine that a third sector in a second cache line of the cache memory is included in the number of sectors; and
modify a second status indicator associated with the third sector that invalidates the third sector.

16. The system of claim 11, wherein to modify the first status indicator, the cache controller is configured to modify an indicator associated with the first sector to indicate that the first sector contains invalid data.

17. The system of claim 11, wherein to modify the first status indicator, the cache controller is configured to modify an indicator associated with the first sector to indicate that the first sector does not contain data to be stored in a backing store.

18. The system of claim 11, wherein the first cache line includes 128-bytes, and each sector included in the first cache line includes 32 bytes.

19. The system of claim 11, wherein the instruction comprises an atomic operation that loads data from the first sector to one or more registers atomically with modifying the first status indicator associated with the first sector.

20. The system of claim 11, wherein the cache memory comprises a level one (L1) cache, a level 1.5 (L1.5) cache, or a level two (L2) cache.

* * * * *